United States Patent [19]

Vidovic

[11] 4,364,080

[45] Dec. 14, 1982

[54] DIGITAL VIDEO ANALYZER

[76] Inventor: Jovan Vidovic, 1725 Bucknal Rd., Campbell, Calif. 95008

[21] Appl. No.: 253,667

[22] Filed: Apr. 13, 1981

[51] Int. Cl.³ .................... H04N 9/62; H04N 7/02
[52] U.S. Cl. .................................. 358/10; 358/139; 358/185; 324/88; 340/799
[58] Field of Search ............... 358/10, 139, 185, 183; 340/514, 720, 744, 799, 800; 324/88

[56] References Cited

U.S. PATENT DOCUMENTS

| | | |
|---|---|---|
| 3,072,739 | 1/1963 | Germany . |
| 3,337,684 | 8/1967 | Sadler . |
| 3,662,380 | 5/1972 | Cargile . |
| 3,816,815 | 6/1974 | Schumann .......................... 324/112 |
| 4,058,826 | 11/1977 | Schneider ............................ 358/10 |
| 4,145,706 | 3/1979 | Hess et al. .......................... 358/10 |

Primary Examiner—Richard Murray
Attorney, Agent, or Firm—Majestic, Gallagher, Parsons & Siebert

[57] ABSTRACT

A digital video analyzer apparatus which provides in a single enclosure, waveform displays, composite video line displays, differential gain/differential phase displays, and vector displays, for a number of different video input signals, the apparatus being capable of displaying the above signals for at least one full horizontal line as selected by the user, and, for a waveform display for at least a full field.

20 Claims, 2 Drawing Figures

DIGITAL VIDEO ANALYZER

BACKGROUND OF THE INVENTION

The invention is directed to an apparatus for digitally analyzing an electronic signal, and relates, more specifically, to a digital video analyzer for analyzing and visually displaying composite video waveforms of the type used in television broadcasting.

In the usual television video signal, one complete picture is called a frame which, in turn, consists of two interlaced fields. A frame comprises 525 horizontal lines in the U.S. NTSC color TV system (625 lines in the European PAL color system). In order to reduce flicker effects, two fields of 262.5 horizontal lines a piece are used to scan all 525 horizontal lines. The 262.5 horizontal lines scanned by the first field of one frame comprises a scanning of every other line. During the next field, the remaining 262.5 lines are scanned.

Associated with the scanning of each field is a portion of the video waveform which includes control signal for the period during which the electron beam is moved from the bottom of the screen to the top of the screen to begin scanning the next field. This interval comprises a plurality of vertical sync pulses, a plurality of equalization pulses, a plurality of horizontal sync pulses, and a vertical blanking signal. In the NTSC system, 60 fields per second are scanned; while in the PAL system, 50 fields per second are scanned.

Each horizontal line comprises a horizontal blanking interval, within which occur a horizontal sync signal, followed by a color synchronization burst and then luminance and chrominance information. In the NTSC system, the full horizontal line has a period of approximately 63.56 microseconds, with the horizontal blanking and sync signal occupying a period ranging from 10.16 to 11.43 microsecond. The vertical blanking and synchronization interval occupies 21 horizontal lines or 1250 to 1333 microseconds. Upon consideration of the above signals, frequencies and pulsewidths, it is apparent that a wide range of signals, frequencies and time periods are present, all of which need to be monitored in order to provide a satisfactory video signal.

In a typical television broadcast studio operation, a number of signal analyzing apparatus are required to monitor and analyze the video signal. Among these apparatuses are a picture monitor for viewing the actual picture content of the video signal, a field analyzer for displaying a full field of the composite video signal, an apparatus for viewing the signal characteristics of a selected single horizontal line, apparatus for detecting the chrominance signal within the selected line so that differential gain and phase measurements may be displayed, as well as a polar display of the chrominance difference signals obtained.

In the past, each piece of signal information sought to be monitored required a separate piece of test equipment. Necessarily, this requirement reduces the ability for simultaneous viewing of the various picture parameters with respect to each other by station personnel. Typically, special test circuits used in conjunction with a studio oscilloscope are often used to monitor such picture parameters as the chrominance vector display, differential phase and differential gain, as well as the selected horizontal line.

The field analyzer provided a visual display of a full field of the composite video signal. Typically, the field analyzer was an oscilloscope-type display of the composite video scanned at a field rate. The result was a near solid band of illumination across the oscilloscope screen with the vertical sync intervals appearing as non-illuminated columns, with those levels being present for a longer period having a higher intensity than those signal level present only for a short period within the waveform.

In the past, selected lines of the composite video signal could be viewed using an oscilloscope; however, because a single line of the video signal is not repeated until a full field later, the scope display appears as a number of horizontal line waveforms traced over each other. As such, clean display of a single horizontal line is difficult to obtain. Additionally, because the desired horizontal line waveform will be swept just once across the oscilloscope screen, the intensity of the displayed waveform will be low.

In a storage scope, a single horizontal line can be electrostatically preserved in a storage tube and displayed, however, the quality of the displayed waveform diminishes over time and can easily be obliterated by the wrong turn of a dial.

The polar or vector display of the chrominance different signals was typically obtained using a vector scope which demodulated the composite video signal to derive the difference signals and converted the difference signals into a polar display format.

A common characteristic of the above previous test equipment for monitoring the composite video signal is that their circuits and display signals were directed to the display of waveforms using an oscilloscope-type format, that is, deflecting a beam vertically as it is moved horizontally across the screen. In the past, some effort has been directed toward generating a signal format which is suitable for displaying a waveform using a raster-scanning type display. Typical of the patents directed to such apparatus for monitoring signal waveforms are Hess, et al., U.S. Pat. No. 4,145,706 and Schneider, U.S. Pat. No. 4,058,826. In Hess, the invention was directed to an apparatus for displaying a horizontal frequency-coupled input signal on the picture screen of a video display device such as domestic television receiver. With respect to composite video signal analysis, the above invention had limited breadth. As disclosed, the invention appears capable of displaying only the active line portion of the composite video signal. As such, the portion of the composite video signal such as horizontal sync and the colorburst synchronizing signal were not displayable.

In Schneider, an apparatus is disclosed for displaying a waveform on a raster-scanning type display. However, the manner in which the horizontal display signal is generated requires that in order to view the display signal in the usual vertical axis—amplitude and horizontal axis—time orientations, the raster-scanning display device must be turned on its side.

In none of the above apparatuses is it suggested or taught that substantially all of the various studio test equipment functions can be combined into a single digital video analyzing apparatus.

Additionally, even when a satisfactory waveform display can be obtained using an oscilloscope-type display, the time periods necessary to display such a waveform, for example, one full horizontal line, are too long for direct conversion of such waveform for display on a raster-scanning type display. For example, because a full horizontal line of a composite video signal occupies approximately 64 microseconds of time, and because the active line of a raster-scanning type display is typically 54 microseconds, it is clear that in order to display the 64-microsecond waveform on the raster-scanning display, some portion of that waveform will have to be omitted. This practical 54-microsecond time period limitation on the duration of waveform which can be displayed on the raster-scanning display further limits the utilization of a raster-scanning type display in the monitoring of the various waveforms of interest.

A further limitation of the prior test equipment apparatus was the single-color beam utilized to trace out a particular waveform on the visual display screen. If two or more waveforms were being monitored, the waveforms have to be physically separated on the screen so as to be distinguishable from each other.

The present invention of a digital video analyzer takes the place of separate test instruments by accepting up to three synchronized or non-synchronized video signals for simultaneous display on a precision color video monitor in three distinct colors.

Each signal can be independently stored in memory contained within the apparatus for later recall or for comparative evaluation, or as a signal source.

A reference graticule, which is digitally generated, is automatically matched to each test mode. This permits fast and accurate measurement, and eliminates the need for calibration.

The internal memory of the present invention permits spatial and time analysis of the video signal. Additionally, all waveform displays can be shown superimposed on the picture selected as the input source.

SUMMARY OF THE INVENTION

The foregoing and other problems of the prior art waveform analyzing apparatus are overcome by the present digital video analyzer for analyzing and visually displaying a selectable interval of a waveform, and information contained within the waveform interval, on a raster-scanning type display, the digital video analyzer comprising frame analyzing means and line analyzing means.

The frame analyzing means comprises level analyzer means, memory means and timing means. The level analyzer means sample consecutive subintervals of the input waveform and determine the presence of a plurality of predetermined signal reference magnitudes within each subinterval. The level analyzer means generate a binary word for each subinterval which is representative of the magnitudes which were found to be present within each subinterval.

The memory means store the binary word for each sampled subinterval. The data stored within the memory means is read from the memory means in a format such that horizontal data words are formed, each corresponding to one signal reference magnitude, which indicate in which of the subintervals the particular reference magnitude was present. Each horizontal data word corresponds to one horizontal line of the raster-scanning display so that when all horizontal data words are displayed the full, analyzed waveform interval is displayed.

The timing means supply timing signals for controlling the formation of the binary word within the level analyzer means and for controlling the rate at which the horizontal data words are read out of the memory means and supplied to the raster-scanning type display.

The line analyzer means comprise processing means for conditioning the input signal, means for sampling the conditioned input signal, analog-to-digital (A/D) conversion means for converting the sampled data into binary words, memory means for storing the binary words, digital-to-analog (D/A) conversion means for converting the binary words stored within the memory means into an equivalent analog form, and the means for scanning and converting the analog levels into a horizontal data format suitable for display on a raster-scanning display.

The line-analyzer processing means condition, detect, and demodulate the input signal to extract information sought to be visually displayed.

The sampling means of the line analyzer convert the extracted information for each sampling period into binary form.

The line analyzer memory means supply data to the digital-analog conversion means at a rate determined by the active line rate of the raster-scanning type display.

The scanning means for the line analyzer scan the analog signal as it is supplied by the D/A conversion means and examines the data for the presence of a specified reference level. The reference level is incremented after each full scan of the analog signals which correspond to the waveform interval. The result is a horizontal data word which can be displayed on a raster-scanning type display. Each full scan of the analog signals at a specific reference level corresponds to one horizontal line of the raster-scanning display.

The processing means for the line analyzing means include circuitry for deriving chrominance information from the video signal, as well as differential amplitude and phase information from the chrominance signal. The scanning means include circuitry for converting chrominance difference signals into a polar format. As such, the digital video analyzer is capable of displaying the picture, which is the source of the video signal being analyzed, a horizontal line interval, differential phase and gain of the chrominance signals in the line, a vector representation of chrominance difference signals, as well as a waveform analyzed field.

Because the memory means are used in the line analyzer means, a full horizontal line can be analyzed and displayed in real time. This is because the memory means permit the data obtained from the sampling of the full horizontal line to be stored for use at a later time. In any field, a specific horizontal line is present once. Therefore, while the horizontal line waveform occupies a period of approximately 64 microseconds, information within that particular horizontal line will not be repeated or modified until a full field has passed. Therefore, information from the analyzed horizontal line can be stored in the memory means and read out for display on the raster-scanning device in real time. The full horizontal line can be displayed, despite the fact that the active line of the raster-scanning display is usually 54 microseconds in length and the full horizontal line is typically 64 microseconds in length, by reading the information from the memory means using a read clock which is at the raster-scanning active line rate.

Accordingly, it is an object of this present invention to provide a multi-channel apparatus for analyzing and displaying a selectable interval of a waveform and information contained within such waveform interval on a raster-scanning type display.

It is another object of the present invention to provide an apparatus for the simultaneous display of a waveform analyzed field of a TV video input signal, and line characteristics of a selected line within the input video signal.

It is a further object of the present invention to provide an apparatus which combines the waveform analyzer, vectorscope, line monitor, picture monitor, and differential phase/differential gain display functions into a single unitary piece of equipment.

It is a still further object of the present invention to provide an apparatus for analyzing and visually displaying information contained within a selectable interval of an input signal suitable for display on a raster-scanning type display wherein the interval can be displayed in real time.

It is a further object of the present invention to provide a digital video analyzer which is capable of displaying a number of parameters of a selected waveform, and further wherein each parameter is displayed in a separate color.

It is another object of the present invention to provide an apparatus for analyzing and visually displaying information contained within a selectable interval of an input signal on a raster-scanning type display further including a graticule against which the displayed signal may be referenced.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
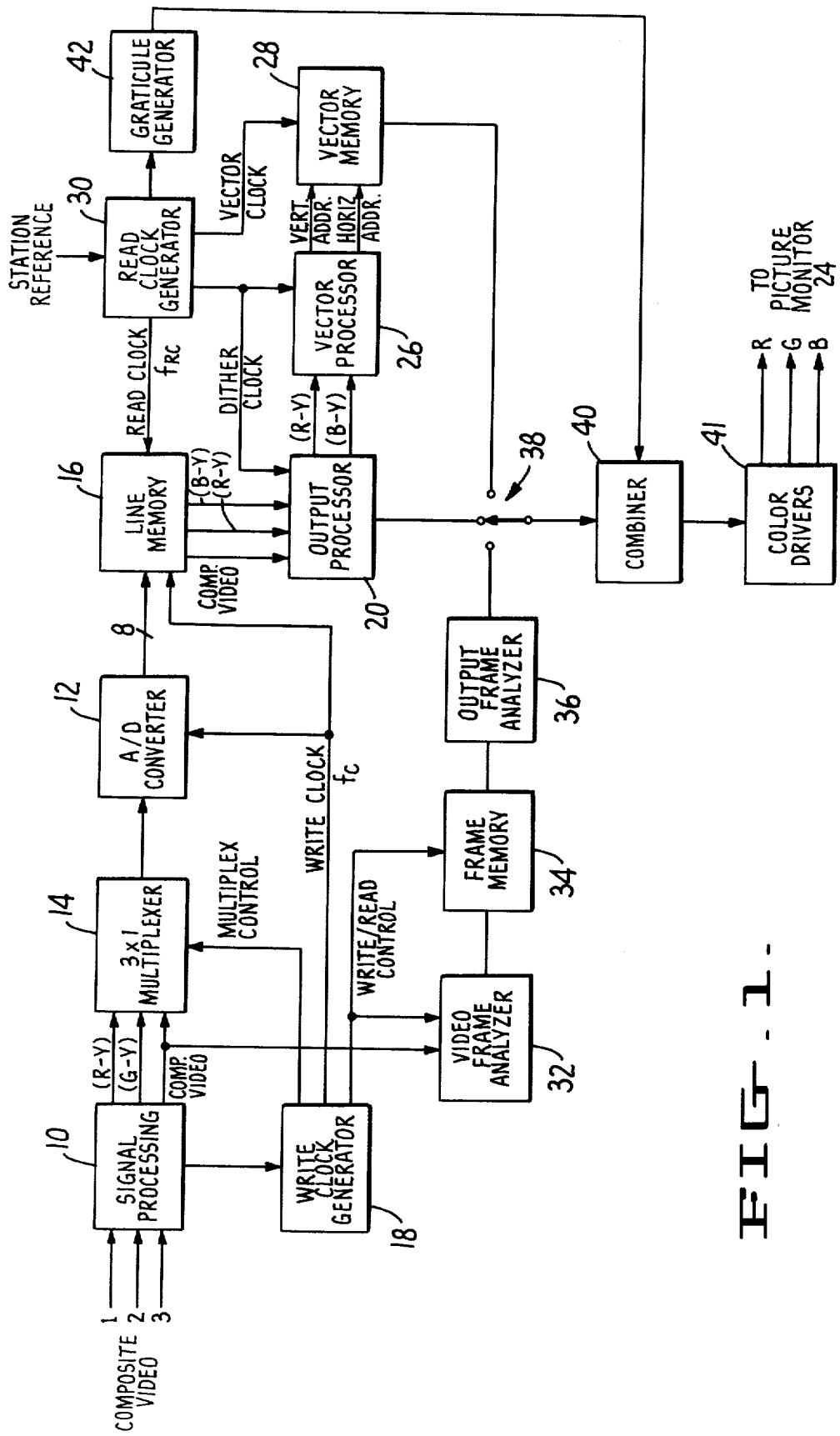
FIG. 1 is a simplified, overall block diagram of the present invention.

Referring more particularly to FIG. 1, an overview of the present invention will now be given. The input video signals to be processed are received by the signal processing circuitry 10. The signal processing circuitry includes bandpass filters for separating the chrominance signals from the input signal, video gain control circuits for conditioning the composite video, amplitude and phase detector circuits for extracting differential gain and differential phase information, and quadrature demodulating circuitry for deriving chrominance difference signals. Also included are sync-separation circuitry for detecting the occurrence of horizontal and the vertical synchronization pulses within the input video signal. The composite video, chrominance difference, and differential gain and differential phase signals which are derived in the signal processing circuitry 10 are supplied to an A/D converter 12 through a multiplexer 14. The multiplexer 14 converts the various signals from the signal processing circuitry 10 into a serial analog data stream. The A/D converter circuitry 12 converts this analog data stream into a stream of binary words. These binary words are then supplied to a line memory means 16 where the binary data is stored.

The write clock generator 18 controls the multiplexing of the data by multiplexer 14, A/D conversion of the analog data by A/D converter 12, and the storing of the binary data in the memory 16. The clock frequencies from the write clock generator circuitry 18 are derived from the vertical and horizontal synchronization pulses which are detected in the signal processing circuitry 10.

Data from the line memory 16 are supplied to output processing circuitry 20. Output processing circuitry 20 includes D/A converting circuitry for restoring the analog version of the signal sampled by the multiplexer circuitry 14, and level crossing detector circuitry for converting the data from the D/A converter circuitry into a format suitable for display on a raster-scanning type display. The output processing circuitry 20 supplies signals to interface circuitry 22 for relay to the raster-scanning type display 24. The output processing circuitry 20 also supplies the chrominance difference signals to vector processing circuitry 26. Vector processing circuitry 26 converts the chrominance difference signals into a polar display format. The polar display format takes the form of a two-coordinate pair. This coordinate information is stored in vector memory 28. Vector memory 28 then supplies the coordinate information to the interface circuitry 22. Read clock generator 30 supplies the control signals and clocks for controlling the reading of the various data from the line memory 16 and the processing in the output processing circuitry 20, as well as the formation of the vector display format in vector processing circuitry 26 and the vector memory 28. The read clock generating circuitry 30 derives its signals from the station reference.

The signal processing circuitry 10 also supplies a composite video signal to frame analyzing circuitry 32. The frame analyzing circuitry samples at least a full field of the composite video signal, examining the signal over selected subintervals of the field for the presence of a plurality of signal reference magnitudes. The frame analyzer supplies, for each subinterval, a binary word which is indicative of which of those signal reference levels were detected. The frame memory 34 accepts and stores these binary words. The sampling interval and the writing rate into the frame memory 34 are controlled by signals supplied by the write clock generator 18.

Data is read from the frame memory 34 so that a horizontal data words is supplied for each designated signal reference magnitude. That is, for a given signal reference magnitude, a horizontal data word will be supplied which indicates for each subinterval whether or not the designated signal reference magnitude was present in the subinterval. In this manner, the data supplied by the output frame processing circuitry 36 is made suitable for display on a raster-scanning type display.

The output interface circuitry 22 includes electronic switching circuitry 38 for selecting the signal to be displayed on the raster-scanning display 24. The output interface circuitry 24 also includes combiner circuitry 40 which includes filtering and gain control. The combiner circuitry 40 also accepts a graticule signal which is supplied by the graticule generator 42. The selected display signal and the graticule are then combined in the combiner circuitry 40 and thereafter supplied to the raster-scanning type display 24.

The raster-scanning type display can be a color monitor or a black-and-white monitor. In the case where the display 24 is a color monitor, the signals supplied by the output interface circuitry 22 are separated out and supplied to the various color drivers 41 so that the composite video signal is displayed in one color while the analyzed field display is in a different color, for example.

Figure 2:
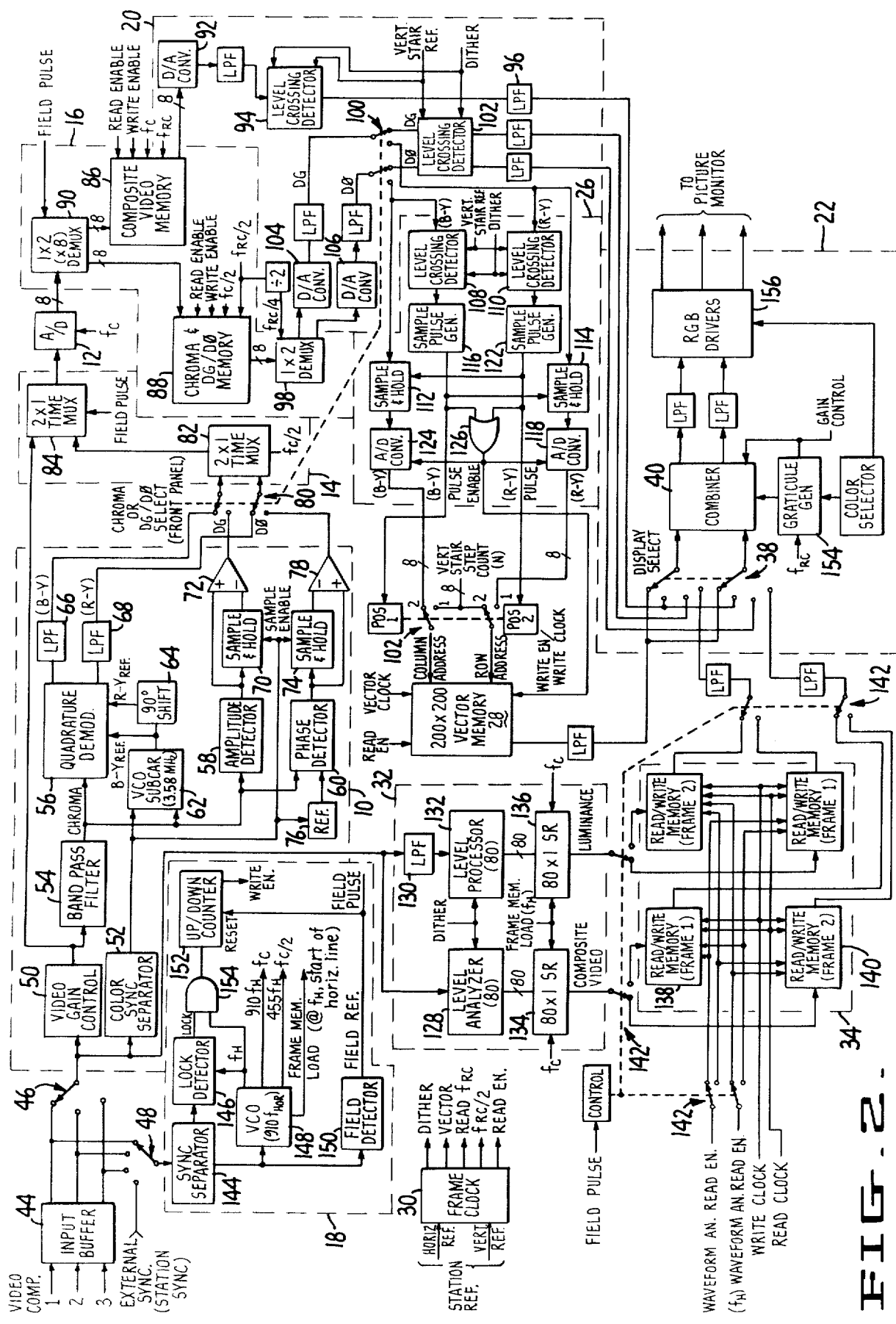
FIG. 2 is a more detailed block diagram of the present invention illustrating the functional interconnection of the various major components.

Referring now to FIG. 2, the digital video analyzer will be described in greater detail. It is to be understood that the digital video analyzer can accommodate a number of independent video signals at its input, and for each input, can provide the above-described visual display. In order to do this, the digital video analyzer utilizes a number of channels which are similar to that shown in FIG. 1 and FIG. 2. For purposes of illustration, the operation of a single channel will be described, with the understanding that similar additional channels exist.

The video signals are received by input buffers 44. These input buffers 44 provide isolation and conditioning. The buffered video signals are supplied to an electronic switch 46, which is controlled from the front panel, for selecting the video signal from which the visual display is to be derived. A synchronization selector switch 48, which is also controlled from the front panel, provides for electronic selection of the signal from which is to be derived the various write clock frequencies from write clock generator 18. The video signal selected by electronic selecting switch 46 is then supplied to the signal processing circuitry 10.

The selected video signal is supplied to a video gain control circuit 50 which conditions the signal and maintains the amplitude of the signal at a uniform level. This prevents gain variations in the composite video signal from affecting the demodulation and information processing within the signal processing circuitry 10. The selected video signal is also supplied to color sync separator 51. Color sync separator 52 extracts the color synchronization burst from the composite video waveform.

The output of video gain control circuitry 50 is supplied directly to the multiplexer circuitry 14, as well as to bandpass filter 54.

Chrominance difference information is obtained in the following manner. Bandpass filter 54 extracts the chrominance information from the composite video signal. The chrominance information is then supplied to quadrature demodulator 56 and to amplitude detector 58 and phase detector 60, as well as to subcarrier VCO 62. Subcarrier VCO 62 is also supplied with the color synchronization signal derived by color sync separator 52.

Subcarrier VCO 62 uses the color sync separator signal to initialize its output frequency and then tracks the chrominance signal from bandpass filter 54 to provide reference signals to the quadrature demodulator 54. The quadrature demodulator 54 extracts chrominance difference signals (B−Y) and (R−Y) from the chrominance signal. Quadrature demodulator 54 uses an in-phase signal from subcarrier VCO 62 for its (B−Y) reference signal, and the subcarrier VCO frequency shifted by 90° as its (R−Y) reference signal. Phase shifter 64 performs this 90° phase shift function.

Low pass filters 66 and 68 filter out the high-frequency components from the demodulated (B−Y) and (R−Y) chrominance difference signals. These chrominance difference signals are then supplied to the multiplexer circuitry 14.

Amplitude and phase information are obtained in the following manner. Amplitude detector 58 detects the amplitude of the chrominance signal supplied from bandpass filter 54. The detected amplitude is then supplied to sample and hold circuit 70 and to a differential amplifier 72. Sample-and-hold circuit 70 is activated by a signal from the color sync separator 52. In this manner, because color sync is present at the beginning of the chrominance information in the horizontal line signal, the sample-and-hold circuit 70 will obtain a sample of the amplitude of the chrominance signal at the start of the active chrominance line. This initial level is then supplied to the other input of differential amplifier 72 so that the output indicates the change of the amplitude of the chrominance signal over the period of the active line, with respect to the initial amplitude of the chrominance signal.

Likewise, sample and hold circuit 74, in response to the color sync signal supplied by color sync separator 52, obtains a sample of the initial phase of the chrominance signal at the start of the active chrominance line. Phase detector 60 derives the phase difference between a reference 76 and the chrominance signal to provide a phase magnitude to sample-and-hold circuit 74 and to differential amplifier 78. The phase information over the active line period is then compared in differential amplifier 78 to the phase at the start of the line. The outputs of both differential amplifier 72 and 78 are then supplied to multiplexer circuitry 14.

In summary, the signal processing circuitry 10 provides a number of signals to the multiplexer circuitry 14: (1) a gain controlled composite video signal, (2) a (B−Y) chrominance difference signal and a (R−Y) chrominance difference signal, and (3) differential phase and differential gain signals.

An electronic switch 80 is controlled from the front panel for selecting between differential gain and phase and the chrominance difference signals for routing to the multiplexer 14.

The multiplexer circuitry 14 converts the above information into a serial data stream according to clocks supplied by the write clock generator 18. In the preferred embodiment multiplexer circuitry 14 comprises two multiplexers. Multiplexer 82 receives the signals from switch 80 and forms a serial data stream in which differential gain and differential phase or (B−Y) and (R−Y) are alternately selected at a frequency which is one half that of the write clock frequency. This data stream is then supplied to multiplexer 84 which provides an output signal which alternates between the signal from multiplexer 82 and the composite video signal, at a frequency which corresponds to the vertical synchronization frequency or field pulse. It is to be understood that multiplexer circuitry 14 is not necessary for the satisfactory operation of the digital video analyzer; however, use of the multiplexer means 14 permits significant savings in circuitry by reducing the number of A/D and D/A converters required.

The output of multiplexer 14 is supplied to A/D converter circuitry 12. A/D circuitry 12 samples the signal supplied by multiplexer 14 at a rate which corresponds to the write clock frequency. A/D circuitry 12 then converts the level obtained for each sample into an equivalent binary word. In this manner, the composite video signal corresponding to the selected horizontal line is sampled at the write clock frequency. When the write clock frequency is high with respect to the horizontal line frequency, an accurate representation of the signal is obtained. Similarly, the differential gain/differential phase or chrominance difference signals are sampled at the write clock frequency rate. Since these latter signals are alternately selected by multiplexer 82 at one-half the write clock frequency rate, A/D circuitry 12 obtains two samples for each segment of the multiplexed data present. It is to be understood that the accuracy with which the resulting binary word represents the actual sampled analog level is a function of the number of bits selected for use in forming the binary word. The higher the number of bits used, the more accurate the representation. Similarly, the fewer the number of bits used, the less accurate the representation. In the preferred embodiment, an eight bit digital word is used.

The line memory means 16 can be viewed as including two distinct memories: A composite video memory 86, and a chroma or differential gain/differential phase memory 88. In practice, a single memory is used with the segregating of the various data achieved by addressing. A demultiplexer 90 receives the stream of digital words being supplied by A/D converter 12, and separates the binary word corresponding to the composite video signal from the binary word corresponding to the chrominance difference signal or differential gain/differential phase signal. The composite video binary words are then supplied to the composite video memory 86 where the words are written into the memory according to the write clock frequency. The chrominance difference or differential phase/differential gain binary words are read into the corresponding memory 88 at one half the write clock frequency. The write enable signals to the memory 86 and memory 88 are provided from a line select circuit which is part of the write clock generator 18.

Because the information to be written in the line memory 16 corresponds to the signals obtained from the selected horizontal line, the write enable signal (which permits the composite video memory 86 and the chrominance or differential gain/differential phase memory 88 to receive data from the demultiplexer 90) corresponds to the presence of the specified horizontal line signal within the processing chain. The horizontal line upon which the analysis is to be conducted is selected by controls on the front panel. This line select information is supplied to the write clock generator circuitry 18 where the circuitry senses the presence of the specified line and outputs the corresponding write enable signal. Therefore, while the signal processing circuitry 10, multiplexer circuitry 14, and A/D converter 12 are processing the whole signal being received through input buffer 44, the line memory is enabled only during that interval corresponding to the presence of the selected horizontal line. It can be seen that by simply changing the timing of the write enable signal, any portion of the input waveform can be written into the line memory means 16.

In this manner, a video signal is supplied to the video gain control 50 for conditioning, whereafter the composite video signal is sampled and converted into an equivalent binary word at a rate which is determined by the write clock frequency. These binary word samples are then stored into a memory 86 at the write clock frequency, starting from a point in the video waveform determined by the write enable commands. The write enable command can be adjusted to occur before the start of a selected horizontal line and to end just prior to the start of the next horizontal line, thereby providing binary data samples of a full horizontal line signal.

Likewise, the composite video signal emerging from the video gain control 50 is filtered by band pass filter 54 to provide chrominance information. The chrominance information is then demodulated and detected to provide chrominance difference signals and differential gain/differential phase levels. The signals and levels are then sampled and converted into binary words at a frequency determined by the write generator clock, and thereafter stored in memory 88. The data stored in memory 88 corresponds to the chrominance information and the differential phase and gain information present in the corresponding horizontal line of the field immediately adjacent the field from which samples were obtained for the composite video data. The contents of memory are therefore written into memory during the duration of the line being sampled. The contents of each memory 86 and 88 are thereafter free to be read.

The format in which the data are stored in the memories 86 and 88 is not suitable for direct display on a raster-scanning display apparatus. In order to provide a suitable format, the data are converted back to analog form by D/A converters, and then converted into horizontal data words by level-crossing detectors.

D/A converter 92 receives binary data from composite video memory 86. The rate at which the data are read from composite memory 86 is determined by the read clock frequency, which is supplied by the read clock generator 30. D/A converter 92 transforms each binary word into its analog equivalent. Recall that each binary word corresponds to a sampled subinterval. The binary words are supplied to the D/A converter 92 in the sequence in which the original waveform was sampled so that the output of the D/A converter 92 provides a substantially similar signal, in time, as was originally present during the actual sampling of the selected line.

This time sequence of levels emerging from the D/A converter 92 is then supplied to level-crossing detector 94, wherein the time sequence is compared against a selected signal reference magnitude. The signal reference magnitude comprises a stair-step function which is incremented at a frequency which corresponds to the active line rate of the raster-scanning display 24, and a dithering signal which is superimposed upon the reference level so that signal levels falling between the reference steps can be detected. The full time sequence of levels corresponding to the originally sampled interval is scanned over the full range of signal reference magnitudes used in the original samplings. For example, the first scan of a time sequence detects levels in the sequence which should be displayed during the first horizontal scan at the top of the raster-scanning display. The second scan corresponds to the second horizontal scan of the raster-scanning display, and so on. In this manner, the time sequence emerging from the D/A converter 92 is scanned level by level to provide horizontal data information for display on the raster-scanning display. The output of the level-crossing detector 94 is filtered by low pass filter 96 to remove the high frequency components.

The differential gain/differential phase data are converted into a horizontal display format in a similar manner, except that due to the multiplexed format in which the data were stored in the chrominance and differential gain/differential phase memory 88 demultiplexing is required. Demultiplexer 98 receives the binary word being read from the memory 88 and separates the chrominance difference signal data or the differential phase/differential gain data into individual segments. That is, if the chrominance difference signals were selected for sampling by electronic switch 80 and the controls in the front panel, chrominance information would be stored in memory 88 so that the data in memory alternate between (B−Y) and (R−Y) data. Likewise, if the electronic switch 80 selected differential gain/differential phase data to be sampled, the data stored memory would alternate between differential phase and differential gain data. The demultiplexer 98 separates the data into a sequence of differential gain binary data and a sequence of differential phase binary data, or a sequence of (B−Y) binary data and a sequence of (R−Y) binary data.

Electronic switch 80 is coupled to electronic switch 98 so that when, by front panel control, electronic switch 80 is set to sample differential gain/differential phase data, electronic switch 100 is set to supply differential gain/differential phase data to level detector 102. D/A converters 104 and 106 are provided in the line between the multiplexer 98 and electronic switch 100 to convert the binary words into equivalent analog levels.

When a differential gain/differential phase display is selected, level detector 102 converts the analog signals into a horizontal data format suitable for display on the raster-scanning display, just as the composite video signal was converted by level-crossing detector 94.

On the other hand, when the chrominance difference signals are selected for display, the chrominance difference signals are applied to vector processing circuitry 26. Level-crossing detector 108 receives the (B−Y) signal from electronic switch 100, while level-crossing detector 110 receives the (R−Y) signal. Both level-crossing detectors are supplied with the stair-step reference level signal and the dithering signal. The (B−Y) signal is also supplied to sample-and-hold circuit 112, while the (R−Y) signal is supplied to sample-and-hold circuit 114. The inputs of the sample-and-hold circuits are cross-coupled with the outputs of the level-crossing detectors so that whenever a level-crossing is detected in one chrominance difference signal, the sample-and-hold circuit in the other chrominance difference signal circuit will be activated to obtain a sample of the level of that other chrominance difference signal at that point in time.

For example, if a level-crossing were detected in the (B−Y) path, the level-crossing pulse supplied by sample pulse generator 116 will activate the sample-and-hold circuit 114 in the (R−Y) path. Because the stair level at which the level-crossing detector 108 detected a level-crossing is known; i.e., the count by which the stair-step reference was incremented being available, the (B−Y) level is known instantly. The corresponding (R−Y) signal level which is present in sample-and-hold circuit 114 is converted by A/D converter 18 into a corresponding binary address. This binary address and the stair-step count address are used to write a "signal present" indication within the vector memory 28.

Depending upon the data path in which a level-crossing is first detected, the A/D address will supply either the column or the row address to the vector memory 28. Electronic switches 120 provide the routing by which the various addresses are directed to the correct location. Electronic switch 120 is controlled by signals from sample pulse generators 116 and 122. Whenever a level crossing is detected in (B−Y) path, the electronic switch is set so that the column address is supplied from the vertical stairstep count and the row address is supplied from A/D converter 118. Similarly, when a level crossing is first detected by level-crossing detector 110 in the (R−Y) path, the column address is supplied by A/D converter 124 and the row address is supplied by the vertical stairstep count. Each time a sample pulse is generated in either sample pulse generator 116 or sample pulse generator 122, a pulse is sent through OR gate 126 to the write enable line of vector memory 28.

Vector memory 28 is organized into a grid with a one-to-one correspondence to the vector display which is to be displayed on the raster-scanning display 24. In the preferred embodiment of the present invention, the vector memory is a 200-by-200 array. Address 100, 100 corresponds to the center of the raster-scanning display. The data set corresponding to row address 100 and any column address corresponds to the (R−Y) axis of the display, while the data set corresponding to column address 100 and any row address corresponds to the (B−Y) axis of the raster-scanning display. It can be seen that, by proper selection of the vertical stairstep count range and the A/D converter range, the magnitudes of the (B−Y) and (R−Y) signals can be plotted within the vector memory 28. For example, recalling that the chrominance difference signals have both positive and negative levels, the vertical stairstep count could be selected so that a count zero corresponds to the most negative signal level expected, while the count two hundred corresponds to the most positive signal level expected. Likewise, the A/D converters 124 and 118 could be configured so that the smallest binary word corresponds to the most negative signal level expected while the largest binary word corresponds to the most positive signal level expected.

In the above manner, the chrominance difference signals are converted into a polar format in which the data within vector memory 28 represents, for a particular chrominance difference signal, a point on the raster-scanning display which corresponds to the magnitude of the (B−Y) signal along a vertical axis from the midpoint of the screen, and the distance of the (R−Y) signal along a horizontal axis from the midpoint of the raster-scanning display screen.

As will be discussed later, a polar graticule is inserted in the combiner circuitry 40 when the vector or polar display is displayed on the raster-scanning display 24.

The vector memory, as described above, is self-clocking with respect to the write operation. The contents of the vector memory are read out at a rate set by the vector clock which is provided by the read clock circuitry 30.

The video frame analyzer circuitry 32 receives the video signals from electronic switch 46 and applies the signal to level analyzer 128 and low pass filter 130. Low pass filter 130 extracts the luminance information from the video signal. This luminance signal is then applied to level analyzer 132.

Level analyzers 128 and 132 examine the signal applied to determine whether certain specified signal reference magnitudes are present within the signal. The output of each level analyzer is a binary word, having the same number of bits as signal reference levels checked-for within the analyzer. Each bit represents the presence or absence of the corresponding signal reference magnitude within the waveform analyzed. A particular signal reference magnitude is deemed to be present if the level is detected within the waveform for a predetermined minimum time interval. Because the video frame analyzer circuitry 32 is intended to provide a visual display of at least a full field of the input video signal as in the prior field analyzers, it is not necessary that each level crossing which has been detected be displayed on the screen. This is because for the display interval involved, only those levels which were present for a minimum amount of time would show up on the display screen. For example, one horizontal line, as displayed in the context of a full field, would occupy a very small fraction of the whole display. Therefore, in order to ensure visibility of those levels which were present for a significant time within the interval, a threshold is selected within the level analyzers above which a "level present" indication will be placed in a binary word, and below which no such indication will be included. The binary word supplied by the level analyzers represents the cumulation of all signal reference magnitudes which were found to be present in the waveform during the sampling interval.

At the end of the sampling interval, the binary word for the interval is loaded into parallel to serial shift registers. Shift register 134 receives the composite video binary word, and shift register 136 receives the luminance binary word. The load pulse which causes the binary words to be loaded into the shift registers is determined by the horizontal sync signal supplied by the write clock generator 18. The binary word within each shift register is clocked-out in serial form at a frequency corresponding to the write clock frequency supplied from write clock generator 18. This serial data is stored in the frame memory 34.

In the preferred embodiment of the present invention, the sampling interval is selected to correspond to the horizontal line frequency. Additionally, in order to include the vertical sync intervals bordering the analyzed field, 303 horizontal lines are sampled and displayed on the raster-scanning display. The write enable signal supplied by write clock generator 18 are, therefore, set to occur just prior to the first vertical sync interval and to end just after the next vertical sync interval.

In one embodiment of the present invention, level analyzers having eighty comparators are used so that simultaneous examination of the waveform for all of the designated signal reference magnitudes can be obtained. In this embodiment, two pairs of memories are required, one for storing the composite video data and the other for storing the luminance data. Referring to FIG. 2, the pairs of memories are shown. Read-write memory 138 is paired with read-write memory 140 to store the composite data. Electronic switch 142 is connected between the output of shift register 134 and the inputs to both memories 138 and 140. A second section of electronic switch 142 is connected at the output of read-write memories 138 and 140.

In operation, one memory of each pair receives data from the shift registers 134 and 136 while the other memory outputs data to the raster-scanning display. For example, as shown in FIG. 2, electronic switch 142 is set so that read-write memory 140 is receiving data from shift register 134, while read-write memory 138 is supplying data to the raster-scanning display. When the analysis of the current waveform interval is completed, electronic switch 142 will change settings so that data from shift register 134 will then be written into read-write memory 138 while data from read-write memory 140 will be read out and supplied to the display 24. In this manner, a near real-time display can be obtained.

Where component count is important and near real-time analysis is not essential, fewer comparators can be used in the level analyzers 128 and 132. For example, in another embodiment of the present invention, 16 comparators each are used in level analyzer 128 and level analyzer 132. This requires that, in order to analyze a waveform over 80 levels total, the waveform must be looked at five times by each level analyzer. With each pass, the reference magnitudes are incremented. The result is a non real-time analysis of the waveform. However, since in the context of television video field, the television scene is not likely to change drastically over a period of five fields, the data obtained does not differ drastically from the case where eighty comparators are used in one level analyzer.

One advantage gained by using 16 comparators is that one memory each for composite video and luminance data are all that are required. This is so, because the time required for writing 16 bits of data into the memory can easily be accommodated during the horizontal sync pulse of each horizontal line of the raster-scanning display. Therefore, during the horizontal sync pulse, data is written into the memory, and during the active line of the raster-scanning display data can be read out of the memory.

For example, each binary word received from the video frame analyzer 32 is written into frame memory 34 in column form. It can therefore be seen that as the column data is written into memory column by column, by reading the data from the memory row by row, a horizontal data word for each row will be obtained which is suitable for display on a raster-scanning type display. In the case of the 16 bit comparator configuration, 303 columns, 16 bits in height, will be read into memory 34 for each field that is analyzed. After five fields have occurred, a full 80 row by 303 column array of data will be present. In practice, in the 16 comparator per level analyzer configuration, the data will be read out of memory as soon as it is written. For example, the first 16 bit word will be written in column form into memory during the horizontal blanking interval of the raster-scanning display horizontal line. The first row of memory will be read out during the active portion of that horizontal line for the raster-scanning display. On the next horizontal blanking interval of the raster-scanning display, the next 16 bit word from the level analyzer will be read into memory, and on the active portion of that line, the second row of data will be read from the memory and so on. While, during the first display field of the raster-scanning dispaly, only a portion of the first set of sample levels will be displayed, the full set of that sampled level data will be displayed on the next field display of the raster-scanning display.

Write clock generator 18 supplies a number of control signals and clock frequencies. Referring to FIG. 2, the write clock generator 18 will now be described. The write clock generator circuitry 18 receives a selected video signal through electronic switch 48. This selected signal is applied to synchronization separator 144 wherein horizontal and vertical synchronization signals are extracted. These synchronization signals are then supplied to lock detector 146, and VCO 148 and the field detector 150.

The VCO 148 is a standard phase lock loop oscillator which is oscillating at a high frequency. A frequency 910 times that of the horizontal sync frequency, $910f_H$ is the write clock frequency $f_c$ in the preferred embodiment. The VCO 148 supplies $f_c/2$ or $455f_h$ and a frequency at the horizontal sync frequency, $f_H$, which is supplied to the lock detector 146. The lock detector compares the horizontal sync frequency received from the sync separator 144 to the horizontal sync frequency received from the VCO 148 to derive a lock signal, when the two signals are in phase. The VCO 148 also supplies a frame memory load signal which comprises a control pulse which occurs at the end of each line of the video signal.

Field detector 150 derives the vertical sync pulse from the signal supplied by the sync separator 144. When the embodiment of the frame analyzer circuitry using eighty comparators is employed, the field detector 150 output signal, which controls switch 142, follows the vertical sync frequency. On the other hand, when the 16-comparator level analyzer circuit is used, a frequency which is at one-tenth the frequency of the vertical sync signal is derived from the field detector 150 in order to permit the multiple frame sampling which is required by such an arrangement. The output of the field detector 150 is also supplied to an up/down counter 152.

The up/down counter 152 forms part of the line selector circuitry. Other inputs into the up/down counter 152 are: an external preset binary word which is supplied from the front panel control, and a clock which is supplied from a gate 154. The clock signal comprises the horizontal sync frequency, $f_H$, from the VCO 148 which is gated to the up/down counter 152 after the write clock generator has locked to the input video signal. This can be seen in FIG. 2 wherein the lock detector 146 supplies the gating signal to the gate 154 which permits $f_H$ to be supplied to the up/down counter 152. The up/down counter then, when the write clock generator circuitry 18 has obtained lock, counts from the externally supplied preset binary word. When the count is completed, the up/down counter 152 outputs a write enable signal to the various memory circuits within the digital video analyzer. Whenever a field has been completed, as indicated by a pulse received from the field detector 150, the up/down counter is reset to begin its count anew.

The sync select electronic switch 48 is controlled from the front panel and permits the write clock generator 18 to derive its synchronization from any of the input video signals or from an external synchronization signal, for example, the station sync signal. This feature is useful when the input video signals are not synchronized with each other, or where an independent sync is sought to be used.

The read clock generator circuitry 30 is referenced to a station frequency reference. A horizontal reference and a vertical reference are supplied by the station. The read clock generator circuitry 30 supplies: a read clock $f_{RC}$ which is approximately 1,140 $f_H$, $f_{RC}/2$, a read enable signal which is realted to the active line frequency of the station reference, a vector clock, and a dithering signal. In the preferred embodiment of the present invention, the frequency of the dithering signal is chosen to be significantly higher than the signals being sampled in the level-crossing detectors, and the vector clock is approximately 6MHz. In the embodiment of the present invention which is designed for use with NTSC waveforms, the write clock is approximately 14.2 MHz and the read clock is approximately 18MHz.

The output interface circuitry 22 comprises an electronic switch 38 for selecting the signals to be displayed on the raster-scanning display, a combiner 40 which includes adder circuitry, filtering, and signal gain control. This permits the selection of gain for each displayed signal, and the addition of a graticule from graticule generator 154, and the designation of color drivers 156. For example, when a single waveform is to be displayed on the raster-scanning apparatus, the waveform can occupy full screen. As such, the gain selected would be such to increase the signal amplitude supplied to the RGB drivers so that the waveform will occupy the full screen. On the other hand, when several waveforms are sought to be displayed on different portions of the raster-scanning screen, the gain of each signal supplied to the RGB drivers is required to be reduced accordingly. The gain control circuitry within combiner 40 permits adjustment of such gain. The gain control is regulated by switches on the front panel. The gain control signal is also supplied to the graticule generator so that the generated graticule is increased or reduced in size according to the gain by which the displayed signal is amplified. In this manner, no extra calibration is required when a waveform is switched from one gain to another since the graticule also changes accordingly. The added circuitry of combiner 40 permits the addition of the graticule from graticule generator 154 to the waveforms being displayed, as well as the inclusion of the video signal which was the source of the waveform being displayed. This permits the source picture may be superimposed upon the whole screen. The display select switch 38 is an electronic switch which is controlled from the front panel. The output of the red-green-blue drivers 156 are then supplied to the picture monitor, or raster-scanning display.

In operation, for a particular channel as shown in FIG. 2, a video signal is analyzed to derive chrominance difference signals, and amplitude and phase difference signals. The composite video signal and the derived information are then sampled and converted into binary words for storage in electronic memory. This sampling and storing is done at a rate which is large compared to the horizontal line frequency so that an accurate binary representation of the various signals is obtained. The binary data are stored into memories as each sample is obtained. The writing of the data into memory is controlled by the write enable signal which is supplied from the line selector circuitry. Because a particular line which is being analyzed occurs once every frame, the writing of the sample data occurs within one horizontal line. At the write clock frequency of the preferred embodiment, a composite video waveform interval which includes the portion of the signal preceding the blanking and horizontal sync pulse of a horizontal line through the start of the next horizontal line can be sampled and stored in memory.

The displaying of the memory content on the raster-scanning type display requires that the contents of the memory be read out at a rate which is significantly higher than the rate at which the contents were written into the memory. This is because all of the stored information is to be displayed, and at a frequency which corresponds to the active line frequency of the raster-scanning display. A sort of time compression is thereby obtained. The horizontal data format is obtained by iteratively comparing the contents of the memory to a reference level. The first reference level, for example, corresponds to the first line of the raster-scanning display; therefore, if that level is present in the stored data, an appropriate indication would be derived in the level analyzer circuitry and thereafter displayed on the raster-scanning display. For each scan of the stored data, the reference level is incremented until a full horizontal data display is obtained. Therefore, the reading of the contents from the memory occurs over a period which corresponds to one field.

In the frame analyzing circuitry, the level analyzing circuitry performs a different function from the level crossing detector in the above line analyzing circuitry. The level analyzing circuitry detects and indicates the presence of all levels having a minimum duration within the particular line for all lines within at least one field. For each line, the level analyzing circuitry provides a binary word which has a plurality of bits, each bit corresponding to a specific signal reference magnitude. All reference magnitudes can be present, or no reference magnitudes can be present, or any number of reference magnitudes can be present. In the read-write memories, the above data is stored as a column. Reading each row of the read-write memory then provides horizontal data which is suitable for display by a raster-scanning type display.

While most of the preceding discussion has been directed toward the analysis of video waveforms, the underlying techniques employed in the digital video analyzer can be used toward analyzing other types of waveform. Minimal modifications are required in order to handle other waveforms. More specifically, modifications to the read-and-write clock circuitry 18 and 30, as well as the input processing circuitry 10 would be required. With that exception, the technique of sampling, storing, and converting to a compatible horizontal display would be left intact.

The terms and expressions which have been employed here are used in terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An apparatus for analyzing and visually displaying a selectable interval of a waveform on a raster-scanning type display comprising
    level analyzer means for simultaneously detecting the presence of a plurality of predetermined signal reference magnitudes within a subinterval of the waveform interval and for generating a binary word representative of the magnitudes detected within the subinterval;
    frame memory means for storing the binary word for each waveform subinterval so that a horizontal data word for each reference magnitude can be read from the frame memory means which indicates, with respect to the reference magnitude, in which of the subintervals the reference magnitude was present in the selected waveform interval;
    means for reading horizontal data words from said frame memory means for transfer to said raster-scanning display; and
    timing means for controlling the formation of the binary word for each subinterval, the transfer of each binary word to the frame memory means, and the reading of the horizontal data words from the frame memory means for transfer to the raster-scanning display.

2. The waveform analyzing and display apparatus, as recited in claim 1, wherein the level analyzer means comprise
    a plurality of voltage comparators for comparing the waveform against the signal reference magnitudes, each comparator comparing a different signal reference magnitude, each comparator supplying an output magnitude for each waveform subinterval which indicates the presence or absence of the particular reference magnitude; and
    means for simultaneously converting the comparator output into a serial data stream to form the corresponding binary word.

3. The waveform analyzing and display apparatus, as recited in claim 1, wherein the frame memory means comprise a plurality of random access memories for simultaneous reception of the binary word and output of the horizontal data word, wherein over the waveform interval, a first random access memory receives the binary word from the level analyzer means and a second random access memory supplies the horizontal data word to the raster-scanning display, and over the next waveform interval the second random access memory receives the binary word and the first random access memory supplies the horizontal data word.

4. The waveform analyzing and display apparatus, as recited in claim 2, wherein the input waveform is a video signal and further wherein the video signal is analyzed over the interval which includes at least one full field.

5. The waveform analyzing and display apparatus, as recited in claim 2, wherein the signal reference magnitudes further include a dithering signal having a period substantially smaller than the period of the waveform being analyzed and having an amplitude which is approximately equal to the difference in magnitudes between consecutive reference levels.

6. The waveform analyzing and display apparatus, as recited in claim 1, wherein the timing means shifts the binary word into the frame memory means at a first high clock rate and shifts the horizontal data out of the frame memory means at a second clock rate substantially slower than the first clock rate.

7. The waveform analyzing and display apparatus, as recited in claim 2, wherein the level analyzer means indicates the presence of a signal reference magnitude in the waveform during each subinterval when the particular magnitude is present for a predetermined minimum time interval.

8. An apparatus for analyzing and visually displaying at least one field of a composite video signal on a raster-scanning visual display comprising
    a plurality of voltage comparators for simultaneous detection of the presence of a plurality of signal reference magnitudes in a plurality of consecutive subintervals of the composite video signal, each voltage comparator supplying an indication when the signal magnitude, which it is monitoring, is present;
    shift register means for converting the comparator outputs for each subinterval into a serial binary word; and
    a plurality of random access memories for receiving and storing the serial binary word for each subinterval, and for supplying a horizontal data word to the raster-scanning display, the horizontal data word indicating, for each subinterval and for the reference magnitude designated, the presence or absence within the subinterval of the reference magnitude.

9. An apparatus for analyzing and visually displaying information contained within a selectable interval of an input signal on a raster-scanning type display, the apparatus comprising processing means for conditioning the input signal, and for detecting and demodulating the input signal to extract the information sought to be used in the visual display;

means for sampling the extracted information and for converting the extracted information for each sampling period into a binary word;

line memory means for storing the binary words according to a write clock, and for supplying the binary words according to a read clock, the write clock having a longer period than the read clock;

digital to analog conversion means for converting each binary word supplied by the line memory means into an equivalent analog level; and means for scanning each equivalent analog level, as received, for the presence of a specified reference level, the reference level being incremented with each complete scan of all equivalent analog levels to produce a data stream, suitable for use with a raster-scanning display.

10. An apparatus for analyzing and visually displaying information contained within an interval of a waveform, as recited in claims 9, wherein the input signal is a TV video signal, and the analyzed interval includes a full horizontal line interval, and further wherein the binary words stored in the line memory means are read from the line memory means at the active line rate of the raster-scanning display.

11. An apparatus for analyzing and visually displaying information contained within the interval of a waveform, as recited in claim 9, wherein the input signal is a color video signal and further wherein the processing means comprise
a quadrature detector for extracting chrominance signals from the video signal; and
differential amplitude and phase detectors for detecting amplitude and phase changes in the video signal over the analyzed interval.

12. An apparatus for analyzing and visually displaying information contained within an interval of a waveform, as recited in claim 11, in which the chrominance signals are derived from the video signal in the processing means, the chrominance difference signals being converted into a sequence of binary words, the binary words being stored in the line memory means, the stored binary words then being read out at a rate equal to the line rate of the raster-scanning display and converted from binary form into an equivalent analog level, the apparatus further including vector processing means for converting the equivalent analog levels of the chrominance difference signals into a polar format suitable for display on the raster-scanning display.

13. An apparatus for analyzing and visually displaying information contained within an interval of a waveform, as recited in claim 9, wherein the scanning means further include a dithering signal for varying the selected reference signal over a predetermined magnitude so that converted analog signals between the reference signal magnitudes are detected.

14. An apparatus for analyzing and visually displaying information contained within an interval of a waveform, as recited in claim 9, wherein the conditioned input signal and the demodulated information from the input signal are simultaneously displayable on the raster-scanning type display.

15. An apparatus for analyzing and visually displaying information, as recited in claim 14, wherein the conditioned input signal is displayed in a color different from the color in which the demodulated information is displayed.

16. The apparatus for analyzing and visually displaying information contained within an interval of a waveform, as recited in claim 12, wherein the chrominance difference signals include a (B−Y) signal and a (R−Y) signal, the vector processing means comprising
level detection means for detecting the presence of a plurality of reference levels in the signals (B−Y) and (R−Y) difference signals and, the reference levels being incremented by an interactive count, for generating an output pulse whenever any of the reference levels is detected in one of the difference signals;
means responsive to the level detector output pulse for sampling the other difference signal and for converting the sampled level into a binary word;
vector memory means for storing data at an address specified by the iterative count and the binary word; and
switching means for supplying the iterative count as the column address and the binary word of the (R−Y) difference signal as the row address when a reference level is detected in the (B−Y) difference signal and for supplying the iterative count as the row address and the binary word of the (B−Y) difference signal as the column address when the reference level is detected in the (R−Y) difference signal.

17. A composite video-signal analyzing apparatus, of the type which accept composite video signals, for providing visual display of the video signal and analyzed characteristics of the video signal, the visual display being of the raster-scanning display type, the analyzing apparatus comprising
composite video display means including
sampling means for periodically sampling the composite video signal over a specified time interval;
analog to digital conversion means for converting each sample into a binary word;
line memory means for storing the binary words and for supplying all of the data words corresponding to the sampled time interval within a time period corresponding to the line rate of the raster-scanning display; and
scanning means for converting the data words into a horizontal display format suitable for display on the raster-scanning display;
differential gain and phase display means wherein a chrominance signal is derived from the composite video signal, the differential display means comprising
differential detector means for determining the change in gain and phase of the chrominance signal over the specified time interval;
analog to digital conversion means for converting a plurality of subintervals of the detected differential gain and differential phase into corresponding differential phase/gain binary words;
phase/gain memory means for storing the differential phase/gain binary words, and for sequentially outputting each differential phase/gain binary word within a time interval corresponding to the line rate of the raster-scanning display; and
conversion means for converting the differential phase/gain binary words into a horizontal display format suitable for display on the raster-scanning display;

chrominance analyzing means for deriving a polar display of the chrominance signal, the analyzing means comprising quadrature detector means for deriving color difference signals from the chrominance signal;

analog to digital conversion means for converting a plurality of subintervals of the color difference signals into binary words;

chrominance memory means for storing the color difference binary words, and for sequentially outputting each color difference binary word within a time interval corresponding to the line rate of the raster-scanning display; and vector processing means for converting the color difference binary words into a polar display format for display on the raster-scanning display; and frame analyzer means for generating a visual display of significant signal levels within the composite video signal interval, the frame analyzer comprising level detecting means for simultaneously detecting the presence of a plurality of predetermined signal reference magnitudes within a subinterval of the composite video signal interval and for generating a binary word for each subinterval which is indicative of the reference magnitudes detected; and frame memory means for storing the binary words and for outputting a plurality of horizontal data words, each horizontal data word corresponding to a selected signal reference level and indicating for each sampled subinterval whether the reference level was present.

18. The composite-viedo-signal analyzing apparatus, as recited in claim 17, further including means for selectively combining the frame analyzer means horizontal data word with the composite video horizontal data word and the differential gain and phase horizontal data word for simultaneous display of each.

19. The composite-video-signal analyzing apparatus, as recited in claim 17, further including a graticule generator for generating a graticule which is superimposed upon the analyzed signal being displayed.

20. The composite-video-signal analyzing apparatus, as recited in claim 18, wherein the graticule generator generates a graticule proportional to the gain of the signal being displayed.

* * * * *